United States Patent [19]
> Ponzo

[11] 4,221,278
[45] Sep. 9, 1980

[54] AUTOMATIC KILL SWITCH

[76] Inventor: Frankieboy Ponzo, 4154 N. Kilbourn, Chicago, Ill. 60641

[21] Appl. No.: 950,264

[22] Filed: Oct. 11, 1978

[51] Int. Cl.³ ............................................. B60K 28/00
[52] U.S. Cl. .................................. 180/283; 200/182; 200/220
[58] Field of Search ................ 180/30, 104, 282, 283; 200/182, 215, 220

[56] References Cited

U.S. PATENT DOCUMENTS

| | | | |
|---|---|---|---|
| 1,107,245 | 8/1914 | Bard | 180/104 |
| 2,192,262 | 3/1940 | Griesedieck | 180/104 X |
| 2,503,449 | 4/1950 | Murray | 180/104 |
| 3,034,097 | 5/1962 | English et al. | 180/104 X |
| 3,599,745 | 8/1971 | Hughes | 180/104 |
| 3,743,802 | 7/1973 | Avenick | 200/61.47 |
| 3,787,647 | 1/1974 | Hughes | 200/61.47 |

FOREIGN PATENT DOCUMENTS

662267 4/1929 France ..................................... 200/220

*Primary Examiner*—John J. Love
*Assistant Examiner*—D. W. Underwood
*Attorney, Agent, or Firm*—Hill, Van Santen, Steadman, Chiara & Simpson

[57] ABSTRACT

A mercury switch sensitive to rotations in either of two selected directions is provided for interrupting the ignition circuit of a motorcycle if the motorcycle should topple over. The switch has a Y-shaped housing with two hollow copper members joined to a hollow stem. An electrical contact is mounted by means of an insulating stopper in the hollow stem. A pool of mercury provides a contact between the electrical contact and the metal Y-shaped housing. A wire is affixed to the electrical contact and a second wire is affixed to the metal housing. A pool of mercury completes the switch between the insulated electrical contact and the metal housing. As the switch is rotated in either a first or a second selected direction, at a predetermined point, the pool of mercury will separate from the insulated electrical contact thereby causing the switch to display an open circuit condition. The automatic switch is installed in series in the ignition system of a motorcycle or similar vehicle thereby terminating the ignition of the vehicle's motor when the vehicle has toppled over. The switch is mounted on the frame of the vehicle at a point of minimum displacement under normal operating conditions.

4 Claims, 6 Drawing Figures

U.S. Patent  Sep. 9, 1980  4,221,278
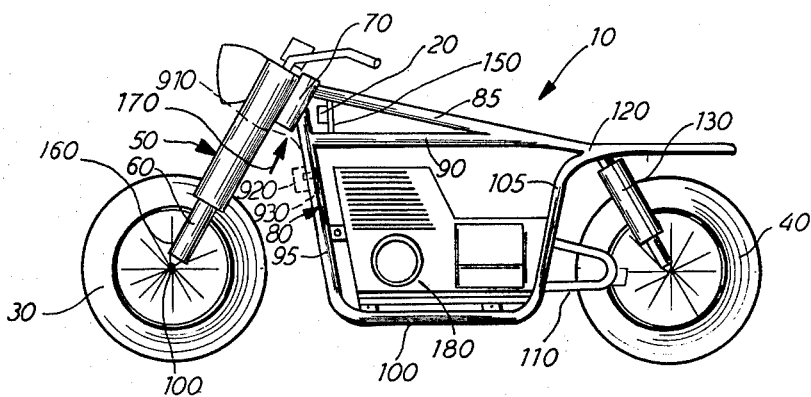
Fig. 1
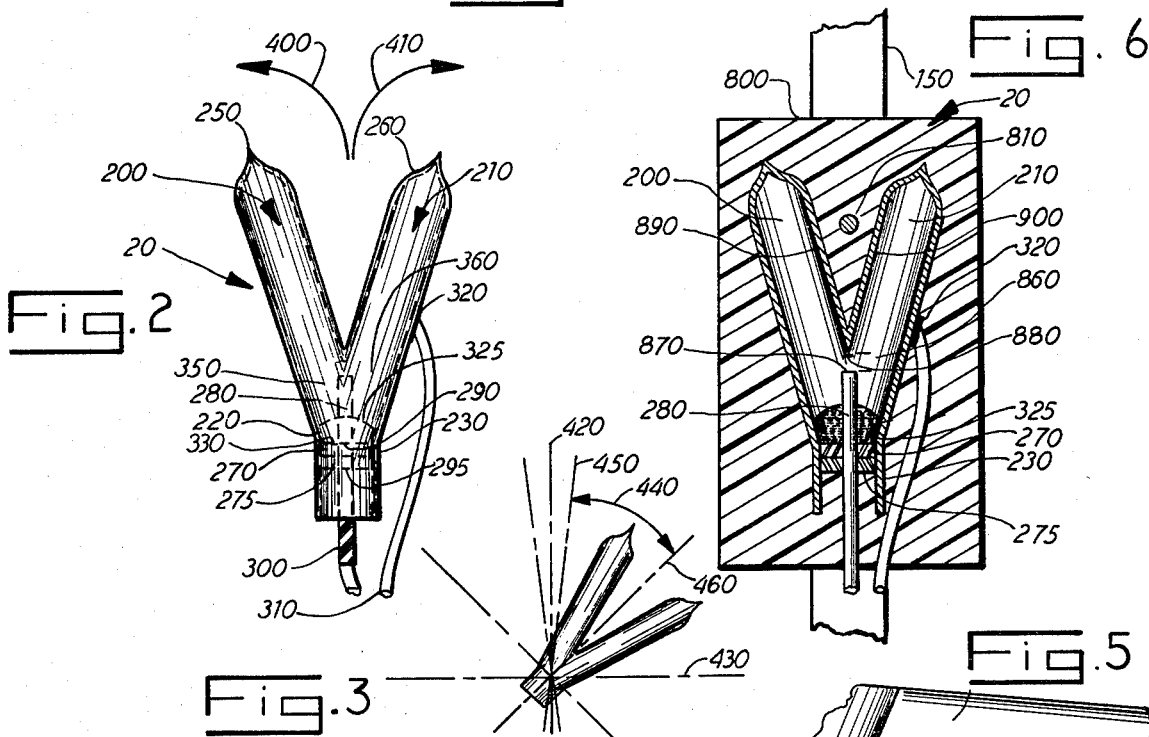
Fig. 2
Fig. 3
Fig. 6
Fig. 5
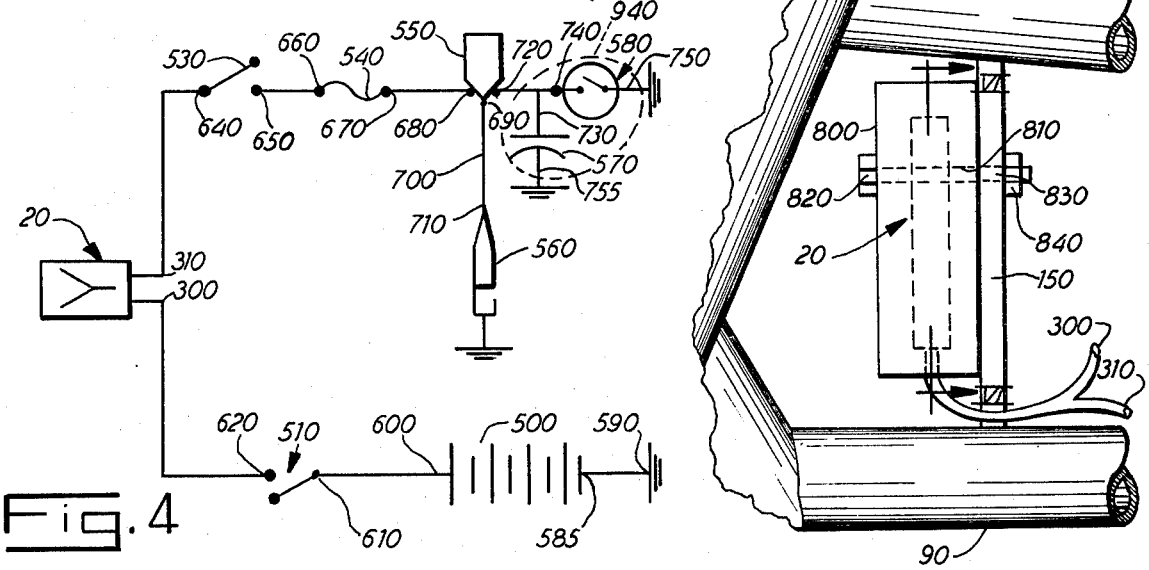
Fig. 4

AUTOMATIC KILL SWITCH

BACKGROUND OF THE INVENTION

1. Field of the Invention

This invention lies in the field of vehicle safety equipment.

2. Description of the Prior Art

With motorcycles or similar two-wheel vehicles it has been a common problem that when such vehicles have toppled over, the motors thereon continue running and driving the rear wheel. This presents a dangerous condition for both the operator who may be partially under the vehicle and for any other persons in the immediate area. There has been a need for a switch mechanism which would automatically terminate operation of the engine upon the device toppling over.

SUMMARY OF THE INVENTION

The invention comprises a mercury switch sensitive to rotations in either of two selected directions for use in combination with a motorcycle or other similar two-wheel vehicle for the purpose of automatically terminating the ignition of the engine of the vehicle where the vehicle has toppled over. The switch is not operative to terminate the ignition of the engine during normal heeling over that such vehicles experience when going around corners or under normal bouncing that the vehicles experience when travelling along the road.

The switch has the shape of a Y with a first and a second hollow member coming together and joining a hollow base. An end of each member, not connected to the hollow base, is sealed off by pinching and welding.

An electrical contact is inserted into the hollow base and is held in position by an insulating stopper. A pool of mercury is located on the top surface of the insulating stopper adjacent to the electrical contact and also to the two members coming together to join the hollow base. A wire is affixed to the electrical contact in any conventional manner such as by soldering or welding. A second wire is affixed to the Y-shaped housing by either soldering or welding. The housing in a practical embodiment is made of rigid copper tubing.

The switch is mounted on the front of the frame of the motorcycle and is located at a point of minimal displacement of the frame. Under normal operating conditions, the stem of the Y-shaped housing has a substantially vertical orientation causing the mercury to pool around the electrical contact which is held in position by the insulating stopper. The mercury provides an electrical path between the electrical contact and the copper housing. A closed circuit exists between the two contacts of the switch in this condition. As the switch is rotated in either a clockwise or a counterclockwise direction, corresponding to the motorcycle falling over in either direction, the pool of mercury eventually separates from the electrical contact and moves along one or the other of the hollow members. This movement of the pool of mercury results in the switch displaying an open circuit between the two wire contacts.

The switch is installed in series in the ignition circuit of a motorcycle. When the motorcycle tips over, the switch exhibits an open circuit due to the pool of mercury having separated from the electrical contact. The ignition circuit thereby becomes open circulated, terminating the ignition of the motorcycle engine.

The angle at which the two members come together with respect to the hollow stem in a preferred embodiment corresponds to an 18° angle with respect to the electrical contact. The switch may be made more or less sensitive to the bicycle assuming an orientation at some angle with respect to the vertical by altering the angle at which the members come into contact with the hollow stem. As the angle is increased, the switch assumes an open circuited position for smaller angular displacements of the motorcycle. As the angle between the two members is decreased with respect to the electrical contact held in place by the insulating stopper, the angular displacement of the motorcycle must continually increase to cause the switch to assume an open circuited condition.

BRIEF DESCRIPTION OF THE DRAWINGS

FIG. 1 is a plan view of a motorcycle with the automatic kill switch mounted thereon.

FIG. 2 is a section view showing the details of the automatic kill switch.

FIG. 3 is a two dimension axis disclosing various ranges of operability of the automatic kill switch.

FIG. 4 is a schematic of a typical motorcycle ignition system.

FIG. 5 is an enlarged fragmentary planar view of the frame of the motorcycle with the automatic kill switch mounted thereon.

FIG. 6 is a section taken along line VI—VI of FIG. 5 showing the automatic kill switch embedded in an epoxy housing.

DESCRIPTION OF THE PREFERRED EMBODIMENT

While the principles of the present invention find a particular utility in an automatic kill switch, it will be understood that the switch arrangement of the present invention may be utilized in other combinations. By way of exemplary disclosure of the best mode of practicing the invention there is shown generally in FIG. 1 a motorcycle 10 having an automatic kill switch 20 mounted thereon. The motorcycle 10 or any other similar two-wheel vehicle has a front wheel 30 and a rear wheel 40 generally arranged such that the axes of rotation of the wheels 30 and 40 are parallel to one another. Supporting the wheel 30 is a yoke 50 which has mounted thereon a shock absorber 60. The purpose of the shock absorber 60 is to absorb the jolts and bumps imposed upon the wheel 30 by the roadway. The yoke 50 has a rotary mounting 70 which connects it to the frame 80 of the motorcycle 10. The frame 80 is composed of a series of supporting members 85, 90, 95, 100, 105, 110, and 120. The rear wheel 40 is supported by the member 110 and by a shock absorber 130 connected to the member 120.

As the motorcycle 10 or similar two-wheel vehicle proceeds along the roadway it heels to the right or the left for purposes going around corners and bounces to some extent as the wheels 30 and 40 pass over obstacles on the road. It is to be understood that the automatic kill switch 20 is designed to be inoperative under normal heeling conditions such as going around corners or under normal bouncing conditions whether travelling on or off the road. The switch 20 is mounted against a member 150 which is affixed to the members 85 and 90. The location of the member 150 is immediately behind the rotary mounting 70 for the yoke 50. The purpose in selecting this location is to place the switch 20 at a location on the motorcycle 10 where obstacles on the road which are encountered by the wheels 30 and 40 will produce minimum deflections of the frame 80. The shock absorber 60 associated with the yoke 50 and the front wheel 30 is designed to allow the front wheel to "give" under the effect of hitting an obstacle such as a rock or rough spot on the road without causing the yoke 50 to be deflected away from the roadway. The shock absorber 130 serves a similar purpose with respect to the rear wheel 40. However, as is indicated in FIG. 1, and is well understood in the motorcycle art, the shock absorber 60 having an end 160 movable in a direction 170 under the effect of roadway forces exerted against the wheel 30 is much more effective at absorbing shocks and minimizing deflections of the frame 80 than is the rear shock absorber 130 which is oriented at an angle with respect to the front shock absorber 60. Thus, a bump or an obstacle encountered by the front wheel 30 will produce less of a deflection at the (member 150 than a similar obstacle being encountered by the wheel 40 will produce at the member 120. As a result, the switch 20 is located at a point against the member 150 where the frame 80 has substantially minimal vertical deflections with respect to the road due to the tires 30 and 40 encountering obstacles on the road.)

The purpose of the automatic kill switch 20 of the present invention is to kill the ignition of a motor 180 affixed to the members 95, 100 and 105 of the frame 80. It is of course understood, that the switch 20 is not to kill the ignition of the motor 180 during normal heeling when going around corners or during normal bouncing as the motorcycle proceeds down the road. Rather, the automatic kill switch 20 is only operative when the motorcycle 10 has toppled over.

FIG. 2 discloses the structure of the automatic kill switch 20. The switch 20 has a first and a second member 200, 210 each of which is hollow. In a practical embodiment, each member 200, 210 has an outer diameter of ⅜". The members 200 and 210 are rigid copper tubing and are joined together at a region 220 to a stem 230 which also is hollow and is of a similar material. The member 200 has an end 250 which is pinched and welded closed. The member 210 has a similar end 260 which is also pinched and welded closed. As can be seen, the general structure of the switch 20 is that of a Y having arms corresponding to the members 200 and 210 and a stem corresponding to the member 230. A pair of insulating stoppers 270, 275 each having a conducting member 280 which passes through a pair of holes 290, 295 are located in the hollow member 230 near the region 220. A wire 300 is connected in any conventional fashion to the conducting member 280. A second wire 310 is brazed or welded 320 to the metal housing of the switch 20. The connection may be to the member 200, the member 210 or the stem 230.

In a practical embodiment, ⅜" outer diameter copper tubing has been cut to correspond to the shapes of the member 200, 210 and 230. The tubing is then welded or soldered together to form a housing for the switch 20 which itself is an electrical conductor. In the preferred mode, the entire housing is conductive, but it need not be to obtain the desired result.

On assembly, a pool of mercury 325 is located on a top surface (330) of the insulating stopper 270. The pool of mercury 325 collects around the electrical conductor 280 and is large enough so as to spread to a side wall 350 of the member 200 and a side wall 360 of the member 210. Thus, the pool of mercury completes a connection between the electrical conductor 280, connected to the wire 300, and the members 200 and 210 of the switch 20 to which the second electrical conductor 310 is connected. In the position of the switch 20 shown in FIG. 2, there is a closed circuit between the wire 300 and the wire 310.

It has been found that if the pool 325 of mercury is just made large enough to cover the surface (330) of the stopper 270 the switch will be relatively insensitive to the normal bouncing around that the frame 80 of the motorcycle 10 receives when travelling. Other heavy conductive liquids could be used instead of mercury if necessary or desirable.

The members 200 and 210 of the switch 20 are shown in FIG. 2 at an 18° angle with respect to the contact member 280. The 18° angle as shown in FIG. 2 has been found to be an optimal position considering the normal amounts of heeling over as are experienced by motorcycle such as the motorcycle 10 when normally travelling around corners. As will be noted from FIG. 2, as the switch 20 is rotated in a direction 400 or a direction 410, the pool of mercury 325 tends to drain into either the member 200 or the member 210. When there is a great enough rotation, the mercury 320 ceases contacting the electrical member 280 thus providing an open circuit between the wire 300 and the wire 310. The point at which the switch 20 goes from a closed circuit condition to an open circuit condition indicates that the motorcycle 10 has toppled over. The point that the switch 20 goes from the closed circuit to the open circuit condition as can be seen from FIG. 2 is very dependent upon the angle at which the members 200 and 210 are located with respect to the electrical contact 280.

FIG. 3 discloses a diagram showing various angles at which the members 200 or 210 may be located with respect to the electrical contact 280. An axis 420 corresponds to the electrical member 280 being vertical when the motorcycle 10 is itself vertical. An axis 430 corresponds to the horizon indicating a general orientation of the motorcycle 10 once it is toppled over. The angle 440 as disclosed in FIG. 3 indicates an operative range over which the members 200 and 210 may be oriented with respect to the electrical member 280. The range runs from a minimum of 5°, 450 to a maximum of 45°, 460. The amount of lean or heel necessary to cause the switch 20 to go from a closed circuit condition to an open circuit condition if the members 200 and 210 are set at a 45° angle, 460 with respect to the electrical connection 280 is of course much less than if the members 200 and 210 are set at a 5° angle 450 with respect to the electrical connector 280.

FIG. 4 discloses the switch 20 connected into a typical ignition circuit for a motorcycle. The ignition circuit consists of a battery 500, a manual ignition switch 510, the automatic kill switch 20, a manual kill switch 530, a fuse 540, a coil 550, a spark plug 560, a 'capacitor' 570 and a set of ignition points 580. A negative terminal 585 of the battery 500 is connected to a ground point 590 usually the frame '80' of the motorcycle 10. A positive terminal 600 of the battery 500 is connected to an input side 610 of the switch 510. An output side 620 of the switch 510 is connected to the lead 300 of the automatic kill switch 20. The lead 310 of the automatic kill switch 20 is connected to an input 640 of a manual kill switch 530. An output 650 of the manual kill switch 530 is connected to an end '660' of the fuse 540. A second end 670 of the fuse 540' is connected to a low voltage input 680 of the coil 550. A high voltage output 690 of the coil 550 is connected by a high tension wire 700 to a high voltage input 710 of the spark plug 560. A low voltage output 720 of the coil 550 is connected to a first 'end 730 of a capacitor 570 and a first end 740 of the points 580.' A second end 750 of the points 580 is connected to the ground point 590. A second end 755 of the 'capacitor' 570 is connected to the ground point 590.

As can be seen from FIG. 4, when the switch 20 goes from the closed circuit condition to the open circuit condition due to the fact that the motorcycle 10 has toppled over, the battery 500 is disconnected from the low voltage input 680 of the coil 550 thus turning off any high voltage on the high voltage line 700 connected to the spark plug 560 thereby halting the operation of the motor 180.

FIG. 5 is an enlarged view of the frame members 85, 90, and 150 with the switch 20 mechanically connected to the member 150. In a practical embodiment, the switch 20 has an encapsulated outer housing 800 of any convenient size and shape wherein the switch 20 is located. The housing 800 has a boring 810 through which is inserted a bolt 820 which passes through a boring 830 in the member 150 and is secured with a nut 840. The alignment of the switch 20 when mounted against the member 150 is such that the electrical connector 280 is vertical when the motorcycle 10 is in a vertical position.

FIG. 6, a section taken along line VI—VI shows the support member 150, the external housing 800 which can be made of any convenient available epoxy with the boring 810 therethrough. The switch 20 is shown in section with the members 200 and 210 being affixed to the stem 230. The second stopper 275 is shown in FIG. 6 within the hollow stem 230 and is for the purpose of insuring that the electrical member 280 will remain in its proper position when the motorcycle is in use. A gap 860 is to be noted between a top surface 870 of the electrical member 280 and a bottom point 880 resulting from an external wall 890 of the member 200 intersecting an external wall 900 of the member 210. The distance 860 should be no less than ⅛" in a practical embodiment.

It will be understood that the switch 20 could also be connected between the point 670 and ground 590 and operated in parallel with the exemplary ignition system of FIG. 4 by altering the location of the electrode 280 and the members 200, 210 so that the switch 20 exhibits an open circuit condition when vertical and becomes short circuited when rotated in the direction 400 or 410. In this mode, the point 620 would be electrically connected to the point 640 and the fuse 540 would limit the current drawn from the battery 500.

Alternately, the kill switch 20 may be mounted at a location 910 on the member 95 as indicated in FIG. 1. A switch 920 corresponding to the switch 20 is affixed at the location 910 by a strap 930. On some motorcycles the bar 150 may not be available for mounting the switch 20 thereon. The location 910 is in that case an acceptable alternate. With respect to FIG. 4, on some motorcycles the points 580 and the capacitor 570 may be mounted together in a single package 940. Also on some motorcycles, the fuse 540 connected between the points 660 and 670 may be connected alternately between the points 610 and 600. In this latter case, the points 660 and 670 are electrically connected together.

Although various modifications might be suggested by those skilled in the art, it should be understood that I wish to embody within the scope of the patent warranted hereon all such modifications as reasonably and properly come within the scope of my contribution to the art.

I claim as my invention:

1. For use with a 2-wheel powered vehicle of the type necessitating a completed electrical circuit means for continued operation, the improvement of a kill switch for the vehicle comprising:

a closed Y-shaped hollow conducting housing having a preferred orientation with a tubular, hollow, conducting stem normally disposed on a vertical axis and (the) two tubular, hollow, conducting arm members, each attached at a first end to a first end of said stem, normally disposed to project angularly upwardly from said stem at a selected acute angle relative to the vertical;

a second end of each of said first arms is permanently sealed; means for insulating inserted into a second end of said stem member, an electrical contact supported by and electrically insulated from said housing by said means for insulating;

a first low voltage electrical conductor connected to an external end of said contact and a second low voltage electrical conductor connected to said conducting housing;

a predetermined quantity of mercury being inserted into a closed volume comprised of said hollow arm members and said hollow stem member which has been closed at said second end by said means for insulating, whereby said quantity of mercury provides an electrical path between said contact and said housing;

said housing is encapsulated in a strong, rigid, insulating material with selected mounting holes usable to attach said switch to the vehicle;

said switch exhibiting a closed circuit condition between said two electrical conductors due to said electrical path when said Y-shaped housing is in said vertical position, said switch being sensitive to a rotation only in a first direction or opposite to said first direction and operable to permit said quantity of mercury to separate from said electrical contact thereby resulting in an open circuit condition between said two electrical conductors.

2. The electrical kill switch according to claim 1, wherein each said tubular arm member joins said tubular stem member at substantially an eighteen degree angle with respect to the vertical.

3. An improved kill switch particularly for use in the low voltage section of an ignition system of a motorcycle comprising:

a hollow, conducting, metal housing with first and second upwardly extending, tubular, arm members joined to a stem, at a selected acute angle with respect to the vertical;

each of said arm members has a sealed upper end;

a first low voltage electrical conductor attached at a first end, to said housing and a second low voltage electrical conductor with a first end that extends through said hollow stem into said housing;

said first end of said second electrical conductor is substantially centered with respect to said stem and mechanically supported by a means for insulation which surrounds said first end and seals a lower end of said stem to form a closed, Y-shaped housing;

a selected amount of conducting liquid is retained within said housing;

an insulating, encapsulating means that completely surrounds said housing;

said two conductors are each connectable, at a second end, in series, to the low voltage side of the ignition system of the motorcycle;

said encapsulated housing is attachable to the motorcycle; when the motorcycle has a substantially upright orientation said two arms extend upwardly with respect to said stem and at said selected angle with respect to the vertical so that a completed circuit is formed between said first conductor, said housing, said conducting liquid and said second conductor permitting the ignition system to function properly, as the motorcycle tips sideways, said conducting liquid moves within one of said arm members, away from said first end of said second contact, producing an open circuit between said two coneuctors and in the ignition circuit of the motorcycle thereby terminating operation of the ignition circuit.

4. The electrical kill switch according to claim 3, wherein each said tubular arm member joins said tubular stem member at substantially an eighteen degree angle with respect to the vertical.

* * * * *